United States Patent
Statchuk

(10) Patent No.: US 7,885,918 B2
(45) Date of Patent: Feb. 8, 2011

(54) CREATING A TAXONOMY FROM BUSINESS-ORIENTED METADATA CONTENT

(75) Inventor: Craig Statchuk, North Gower (CA)

(73) Assignee: International Business Machines Corporation, Armonk, NY (US)

(*) Notice: Subject to any disclaimer, the term of this patent is extended or adjusted under 35 U.S.C. 154(b) by 208 days.

(21) Appl. No.: 11/494,974

(22) Filed: Jul. 28, 2006

(65) Prior Publication Data

US 2007/0055680 A1 Mar. 8, 2007

(30) Foreign Application Priority Data

Jul. 29, 2005 (CA) .................. 2514165
Apr. 28, 2006 (CA) .................. 2545232

(51) Int. Cl.
G06F 7/00 (2006.01)
G06F 17/00 (2006.01)
G06F 17/30 (2006.01)

(52) U.S. Cl. .............. 707/603; 707/776; 707/777

(58) Field of Classification Search .......... 707/100, 707/102, 104.1, 999.1, 999.102, 999.104, 707/603, 777, 778
See application file for complete search history.

(56) References Cited

U.S. PATENT DOCUMENTS

| | | | |
|---|---|---|---|
| 5,940,821 A | 8/1999 | Wical | |
| 5,963,940 A | 10/1999 | Liddy et al. | |
| 6,026,388 A | 2/2000 | Liddy et al. | |
| 6,038,560 A | 3/2000 | Wical | |
| 6,161,084 A | 12/2000 | Messerly et al. | |
| 6,363,378 B1 | 3/2002 | Conklin et al. | |
| 6,405,190 B1 | 6/2002 | Conklin | |
| 6,460,034 B1 | 10/2002 | Wical | |
| 6,510,425 B1 | 1/2003 | Okamoto et al. | |
| 6,526,440 B1 | 2/2003 | Bharat | |
| 6,842,761 B2 | 1/2005 | Diamond et al. | |
| 6,924,828 B1 | 8/2005 | Hirsch | |
| 6,954,750 B2 | 10/2005 | Bradford | |
| 6,963,867 B2 | 11/2005 | Ford et al. | |
| 7,231,405 B2 | 6/2007 | Xia | |
| 7,251,637 B1 | 7/2007 | Caid et al. | |
| 7,266,548 B2* | 9/2007 | Weare | 707/3 |
| 7,272,610 B2 | 9/2007 | Torres | |
| 7,472,113 B1 | 12/2008 | Watson et al. | |
| 7,571,157 B2 | 8/2009 | Chowdhury et al. | |
| 7,689,615 B2 | 3/2010 | Burges et al. | |
| 2001/0054034 A1 | 12/2001 | Arning et al. | |
| 2003/0110158 A1 | 6/2003 | Seals | |
| 2004/0148278 A1 | 7/2004 | Milo et al. | |
| 2004/0230572 A1* | 11/2004 | Omoigui | 707/3 |
| 2005/0165718 A1 | 7/2005 | Fontoura et al. | |
| 2005/0192955 A1 | 9/2005 | Farrell | |
| 2005/0246322 A1 | 11/2005 | Ravikumar et al. | |

(Continued)

*Primary Examiner*—James Trujillo
*Assistant Examiner*—Bruce M Moser
(74) *Attorney, Agent, or Firm*—Shumaker & Sieffert, P.A.

(57) ABSTRACT

A method and system is provided for managing business taxonomy. The system comprises an indexing engine for indexing content of source business oriented metadata. The indexing engine has a content scanner for reading the business oriented metadata, defining taxonomy of the business oriented metadata, and building a content index of the business oriented metadata including a subject index representing the taxonomy of the business oriented metadata. The system also comprises an index store for storing the content index of the business oriented metadata, and a taxonomy engine for providing taxonomy services to users using the content index.

41 Claims, 16 Drawing Sheets

U.S. PATENT DOCUMENTS

| | | |
|---|---|---|
| 2006/0053151 A1* | 3/2006 | Gardner et al. .............. 707/102 |
| 2006/0155685 A1 | 7/2006 | Grim et al. |
| 2006/0212461 A1* | 9/2006 | Meysman .................. 707/100 |
| 2006/0265364 A1 | 11/2006 | Keith, Jr. |
| 2007/0055691 A1 | 3/2007 | Statchuk |
| 2008/0027971 A1 | 1/2008 | Statchuk |
| 2008/0243830 A1 | 10/2008 | Abhyanker |

* cited by examiner

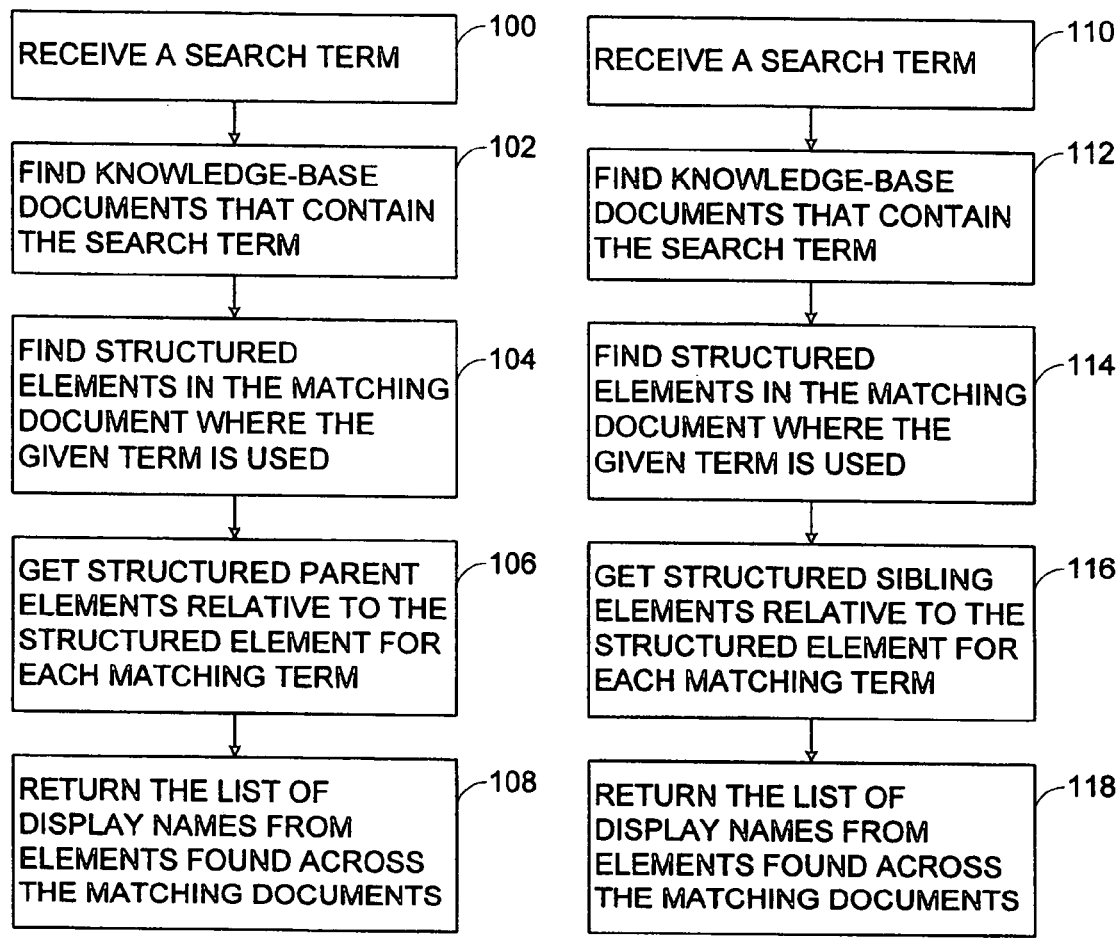
Figure 4A                    Figure 4B

Search for these terms

SearchBar "Text"  Source Context
Figure 15
Figure 16

Figure 20
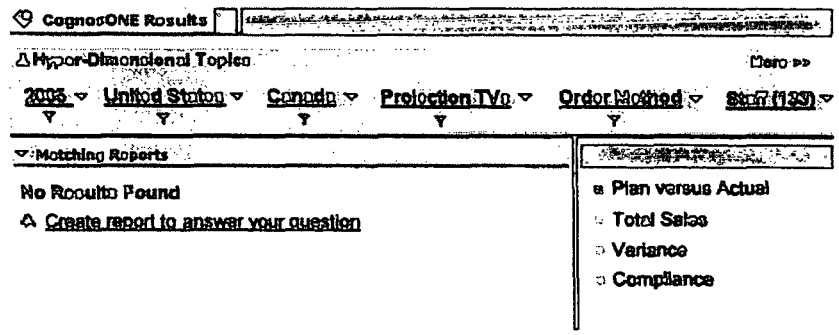
Figure 21
Figure 22

Sales Revenue by Salesperson

| | | | |
|---|---|---|---|
| 2004 | Alessandra Torta | Single Edge | $2,095.60 |
| | | Star Dome | $106,087.02 |
| | | Star Gazer 2 | $81,243.16 |
| | | Star Gazer 3 | $84,999.20 |
| | | Star Gazer 6 | $35,685.02 |
| | | TrailChef Kitchen Kit | $1,094.60 |
| | | TrailChef Single Flame | $1,736.02 |
| | | TrailChef Utensils | $2,006.16 |
| | | TrailChef Water Bag | $1,186.20 |
| | Alessandra Torta | | ($842,510.25) |
| | Alicia Wilcox | Aloe Relief | $443.44 |

Figure 23

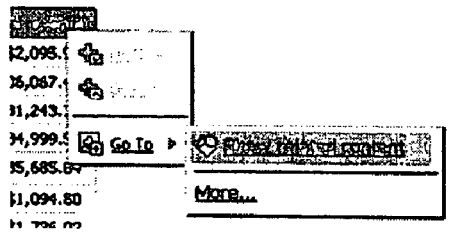

Figure 24

CognosONE Results

▽ All Matching Reports

| Report | Score | | Matching Criteria |
|---|---|---|---|
| @Product Name:: Margin by Product | 80 | ▭ | Prompts: Product name |
| @Product Name:: Profit by Product | 80 | ▭ | Prompts: Product name |
| Great Outdoors | 69 | ▭ | Categories: 2004, Alessandro |
| Wave | 65 | ▭ | Categories: Alessandro Torta |
| @@Profit by Product, Country | 50 | ▭ | Words and phrases |

⚘ Extend Report with Related Data

Figure 25

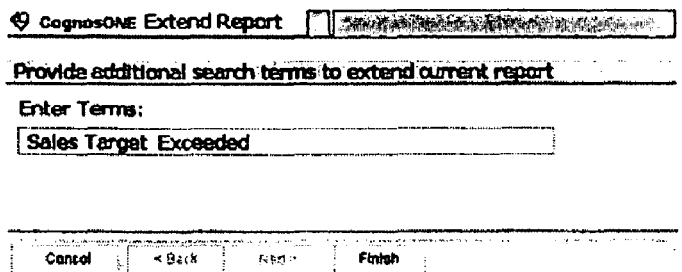

Figure 26

Sales Revenue by Salesperson (Extended)

| | Staff name | | | |
|---|---|---|---|---|
| 2004 | Alessandra Torta | $842,510.36 | $550,000.00 | 292,510.36 |
| | Alisia Wilcox | $338,816.86 | $292,800.00 | 46,016.86 |
| | Ana Orozco | $381,310.62 | $300,000.00 | 81,310.62 |
| | Anders Nilsson | $513,805.02 | $404,200.00 | 109,605.02 |
| | Ashley McCormick | $495,539.10 | $353,100.00 | 142,439.1 |
| | Audrey Lastman | $1,251,253.26 | $709,700.00 | 541,553.26 |
| | Dental Turpin | $412,839.82 | $200,000.00 | 212,839.82 |
| | Donald Chow | $2,124,698.30 | $1,710,600.00 | 414,098.3 |
| | Eduardo Guimarães | $1,826,066.10 | $1,282,300.00 | 543,766.1 |
| | Elizabeth Michel | $658,364.24 | $600,000.00 | 58,364.24 |
| | Ellen Shapiro | $315,558.78 | $300,000.00 | 15,558.78 |
| | Elsbeth Wiesinger | $1,104,678.56 | $767,400.00 | 337,278.56 |
| | Émile Clermont | $409,000.16 | $250,000.00 | 159,000.16 |

Figure 27

Sales Revenue by Salesperson

| | | | |
|---|---|---|---|
| 2004 | Alessandra Torta | Single Edge | $2,095.60 |
| | | Star Dome | $106,067.02 |
| | | Star Gazer 2 | $81,243.16 |
| | | Star Gazer 3 | $84,999.20 |
| | | Star Gazer 6 | $35,665.02 |
| | | TrekChef Kitchen Kit | $1,094.80 |
| | | TrekChef Single Flame | $1,736.02 |
| | | TrekChef Utensils | $2,006.16 |
| | | TrekChef Water Bag | $1,185.20 |
| | Alessandra Torta | | ($842,510.35) |
| | Alisia Wilcox | Aloe Relief | $443.44 |

Staff Details: 2004, United States, Canyon Mule Backpack

| | | | | |
|---|---|---|---|---|
| Alisia Wilcox | Outdoor Gear Co-op | $5,841.36 | $973.56 | $5,841.36 |
| Ashley McCormick | By A Thread | $5,226.48 | $871.08 | $5,226.48 |
| | Jack and Jill Climbing School & Supplies | $2,613.24 | $435.54 | $2,613.24 |
| Bart Scott | By A Thread | $5,072.76 | $845.46 | $5,072.76 |
| Chad Micheels | Outdoor Gear Co-op | $6,148.80 | $1,024.80 | $6,148.80 |
| Dale Fowler | Donovan's Sports | $2,305.80 | $384.30 | $2,305.80 |
| | Falcon Outfitters | $3,381.84 | $563.64 | $3,381.84 |
| Eric Carson | Connor Department Store | $2,766.96 | $461.16 | $2,766.96 |
| | Edward's Department Store | $5,072.76 | $845.46 | $5,072.76 |
| Harold Germaine | Outdoor Gear Co-op | $1,537.20 | $256.20 | $1,537.20 |
| Janice Thomas | Donovan's Sports | $2,459.52 | $409.92 | $2,459.52 |

CREATING A TAXONOMY FROM BUSINESS-ORIENTED METADATA CONTENT

FIELD OF INVENTION

The present invention relates to a metadata content management and searching system and method, especially to a method and system for creating a taxonomy from business-oriented metadata content.

BACKGROUND OF THE INVENTION

Competitive economies motivate business managers and other users to obtain maximum value from their investments for Corporate Performance Management (CPM) tools, such as Business Intelligence (BI) tools, that are used to manage business oriented data and metadata. These CPM tools provide authored reports or authored drill-through targets to link content together. Users often encounter similar problems in finding important reports or relevant data or drilling to related content if it was not previously authored.

Traditional search technologies often provide incomplete or irrelevant results in the CPM environments. There are metadata search tools that run against relational databases. They can fail to find relevant data since they only search databases and do not leverage a customer's investment in CPM tools and applications. Relying on authored drill-through targets can also be problematic as new cube, reports, metrics or plans are added since new drill targets are not always kept up-to-date. Users can have difficulties moving seamlessly between CPM tools or applications, particularly when CPM applications are created by different individuals or departments.

It is therefore desirable to provide a mechanism that allows more effective searches of business oriented metadata content.

There exist search engines that use a full-text index combined with statistical methods to create ordered search results. An example of such a search engine is page ranking that is described in U.S. Pat. No. 6,526,440 issued to Bharat. However, these search engines are not sufficient to search complex data like business oriented metadata since they rely on ranking algorithms that work with data found primarily in the Global Internet and not inside a business.

Some search engines use taxonomies to improve results. Creation of taxonomies has been carried out by a manual process or by an automated process based on advanced linguistic analysis. However, business taxonomies are difficult and expensive to build manually. Also, linguistic analysis are often complicated and thus prone to result in inaccurate outcome.

It is therefore desirable to provide a system that manages business taxonomies automatically without the need for complicated and potentially inaccurate linguistic analysis.

SUMMARY OF THE INVENTION

It is an object of the invention to provide an improved method of creating a taxonomy from business-oriented metadata content that obviates or mitigates at least one of the disadvantages of existing systems.

The invention uses a content index to store knowledge base representations of terms in source documents containing business oriented metadata along with references to the original source metadata content that uses the terms.

In accordance with an aspect of the present invention, there is provided a method and system for building a searchable index corpus that includes taxonomy definitions (or topic hierarchies) obtained from the structure of business reporting metadata.

In accordance with an another aspect of the invention, there is provided a method of managing business taxonomy. The method comprises the steps of reading content of business oriented metadata of an organization, the business oriented metadata including metadata representing a structured hierarchy of reporting elements; defining taxonomy of the business oriented metadata using the metadata representing the structured hierarchy of reporting elements in the business oriented metadata; building a content index of the business oriented metadata including a subject index representing the taxonomy of the business oriented metadata; storing the content index of the business oriented metadata; and providing taxonomy services to users using the content index.

In accordance with another aspect of the invention, there is provided a computer readable medium storing instructions or statements for use in the execution in a computer of a method of managing business taxonomy. The method comprises the steps of reading content of source business oriented metadata; defining taxonomy of the business oriented metadata; building a content index of the business oriented metadata including a subject index representing the taxonomy of the business oriented metadata; storing the content index of the business oriented metadata; and providing taxonomy services to users using the content index.

In accordance with another aspect of the invention, there is provided a propagated signal carrier carrying signals containing computer executable instructions that can be read and executed by a computer, the computer executable instructions being used to execute a method of managing business taxonomy. The method comprises the steps of reading content of source business oriented metadata; defining taxonomy of the business oriented metadata; building a content index of the business oriented metadata including a subject index representing the taxonomy of the business oriented metadata; storing the content index of the business oriented metadata; and providing taxonomy services to users using the content index.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 4A is a flowchart showing an embodiment of the procedure for determining parent topic terms;

FIG. 4B is a flowchart showing an embodiment of the procedure for determining sibling topic terms;

FIG. 15 is a diagram showing another example of a report and user interface display by the metadata content management system;

FIG. 16 is a diagram showing another example of a report and user interface display by the metadata content management system;

FIG. 17 is a diagram showing another example of a report and user interface display by the metadata content management system;

FIG. 18 is a diagram showing another example of a report and user interface display by the metadata content management system;

FIG. 19 is a diagram showing another example of a report and user interface display by the metadata content management system;

FIG. 20 is a diagram showing another example of a report and user interface display by the metadata content management system;

FIG. 21 is a diagram showing another example of a report and user interface display by the metadata content management system;

FIG. 22 is a diagram showing another example of a report and user interface display by the metadata content management system;

FIG. 23 is a diagram showing another example of a report and user interface display by the metadata content management system;

FIG. 24 is a diagram showing another example of a report and user interface display by the metadata content management system;

FIG. 25 is a diagram showing another example of a report and user interface display by the metadata content management system;

FIG. 26 is a diagram showing another example of a report and user interface display by the metadata content management system;

FIG. 27 is a diagram showing another example of a report and user interface display by the metadata content management system;

FIG. 28 is a diagram showing another example of a report and user interface display by the metadata content management system;

FIG. 29 is a diagram showing another example of a report and user interface display by the metadata content management system;

FIG. 30 is a diagram showing another example of a report and user interface display by the metadata content management system;

FIG. 31 is a diagram showing another example of a report and user interface display by the metadata content management system;

FIG. 32 is a diagram showing another example of a report and user interface display by the metadata content management system;

FIG. 33 is a diagram showing another example of a report and user interface display by the metadata content management system;

FIG. 34 is a diagram showing another example of a report and user interface display by the metadata content management system; and FIG. 35 is a diagram showing another example of a report and user interface display by the metadata content management system.

DETAILED DESCRIPTION

Figure 1:
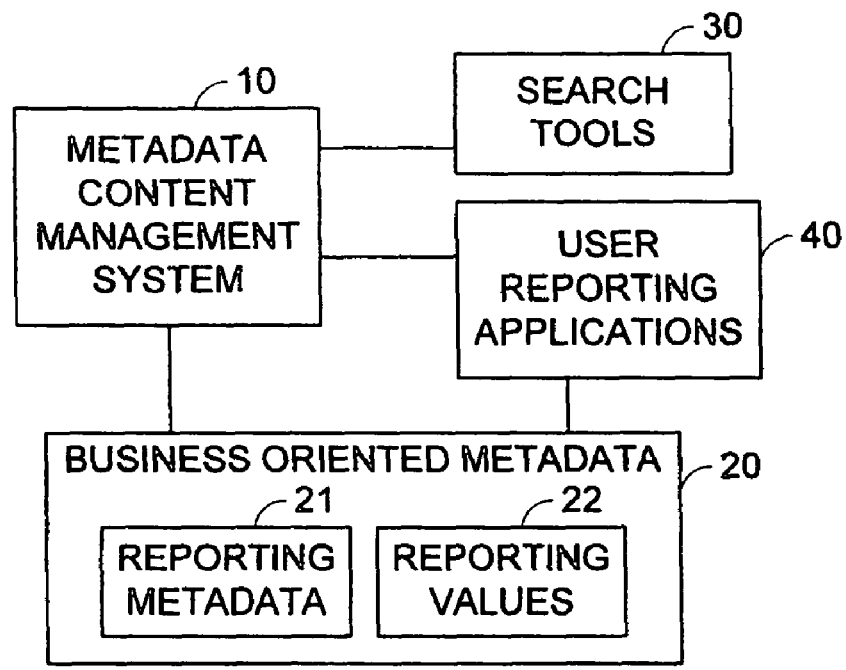
FIG. 1 is a block diagram showing a metadata content management system in accordance with an embodiment of the present invention.

Referring to FIG. 1, a metadata content management system 10 in accordance with an embodiment of the invention is described. The metadata content management system 10 is suitably used for an enterprise or other organization that has sources of business oriented information, i.e., business oriented metadata 20. The metadata content management system 10 interacts with the business oriented metadata 20, as well as one or more search tools or components 30 and user reporting applications 40 used by the organization.

An organization typically has untapped sources of information, e.g., business oriented metadata 20 including reporting metadata 21 and specifications and key report values 22 of the user reporting applications 40. The business oriented metadata 20 includes OLAP and dimensional business data defined by the user reporting applications 40. These information, metadata and values may be collectively called as business oriented metadata 20 in this specification.

The metadata content management system 10 indexes the content of the business oriented metadata 20. It analyzes the business oriented metadata 20 to create a search index. Since the search index is created from the organization's metadata 20, it is suitable for the organization. By providing such a search index, the metadata content management system 10 promotes navigation between BI tools 30 and reporting applications 40, creating a strategic view of CPM assets. The metadata content management system 10 captures application context, e.g., "viewing location" or "query parameters", by creating the search index from the reporting metadata 21. The search index created by the metadata content management system 10 enables many unique navigation options beyond traditional folder browsing and text searching.

Figure 6:
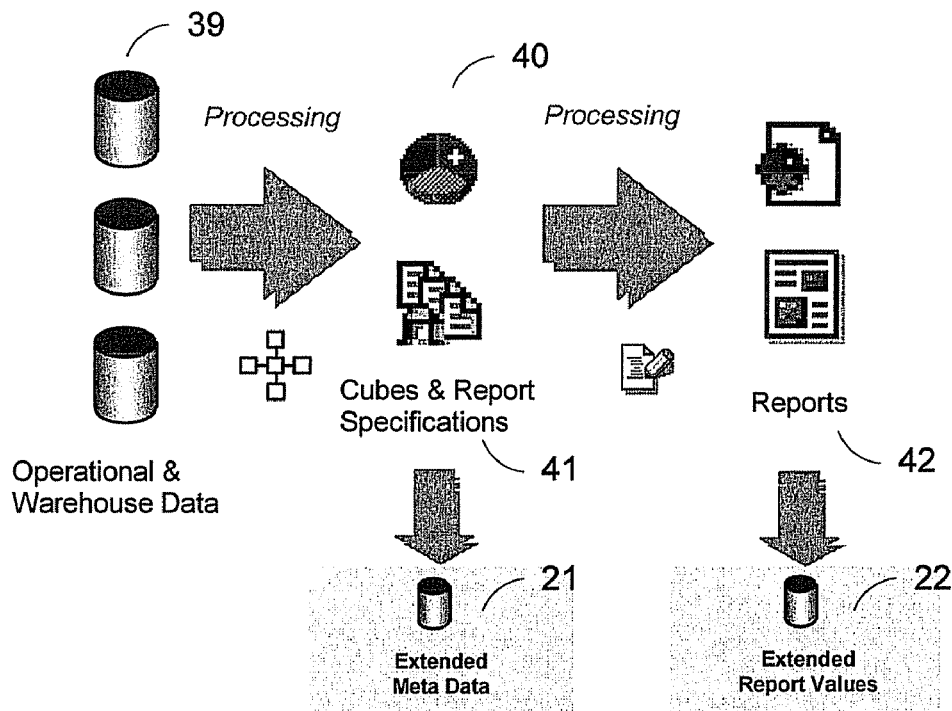
FIG. 6 is a diagram showing metadata and report values.

As shown in FIG. 6, a typical organization has various data sources 39, such as operational databases and/or data warehouses, and several CPM tools or user reporting applications 40 that create cubes and/or report specifications 41 and generate reports 42. Reporting metadata 21 and associated values 22 are produced by those applications 40. Other business oriented metadata may be exported from metadata modeling tools. While authoring reports in reporting applications 40, the creation of new hierarchies and data definitions occur. These hierarchies and data definitions are useful for drilling and searching. This data is often more recognizable to end-users since this is the data or text that the users see in applications 40 and their reports 41. These metadata and report data are considered as extended metadata 21 to describe the metadata created by different authoring and processing phases. Extended report data 22 refers to values created in a similar fashion.

These extended metadata 21 and report data 22 can be viewed as new BI data or business oriented metadata 20 of the organization. The metadata content management system 10 leverages the new BI data 20 to provide searching and drilling that was previously unavailable in existing systems, as described below.

Examples of extended metadata 21 added by the authoring process includes dimension names, dimension levels, category names, alternate category names, cube hierarchies, table and record names, group names, parent/child relationships between categories, groups or tables, authored drill target names, CPM tool's model entities such as packages, namespaces, query items, query sources and relevant authored relationships. Examples of extended authored report values 22 include items related by one of more dimensions, categories, measures groups or tables, calculated values, and annotations.

For example, a BI tool may provide dimensional business data, such as crosstable providing dimension, category and measure names. These names represent extended metadata 21. These names may or may not match table/column names in a star schema or other relational model. Yet each of these names represents an important potential target for drilling or searching. Values stored in a cube, including calculated values, represent extended data or values 22. They are a valuable target for searching. Like extended metadata 21, many of these values 22 are not found in any other data store.

Another example of a reporting tool 40 may provide a report with columns. In such a report, each of the column heading represents extended metadata 21. The report grouping, e.g., by country, represents another form of extended metadata 21. Report values themselves represent extended report data 22. They offer important linking and search targets.

In these cases, the extended metadata names are the same as those viewed by the report user. Thus, these extended metadata names are often most relevant and recognizable to the report user. Using these metadata names allows the metadata content management system 10 to provide information relevant and recognizable to the report user. These metadata names may or may not match the names used in the underlying databases.

Authored links, such as those anchored to the column name "Sales Rep Name", provide additional summary information about the linked reports. This information also represents extended metadata 21. This information allows the metadata content management system 10 to further increase search relevance about the destination content of the metadata 20 including the metadata 21 or report values 22.

The metadata content management system 10 indexes content of the business oriented metadata 20 and generates a content index or index corpus which is a searchable database of representations of the content of the business oriented metadata 20, as further described below.

Research related to data searching and linking technologies commonly identifies two basic types of data: structured data and unstructured data. Structured data is defined by a formal schema. Typically structured data is searched with utilities of Online Analytical Processing (OLAP), Structured Query Language (SQL) and eXtensible Markup Language (XML). Unstructured data is normally found in documents and static web pages. Typically unstructured data is searched using free-form queries with web tools, such as Google™.

The metadata content management system 10 provides searching functions over both types of data by using the content index of the business oriented metadata 20. Structured data searches are used to implement report-to-report drilling. This includes listing selecting from multiple targets. The metadata content management system 10 typically uses its internal search engine or navigation and drill engine 14 (FIG. 2A) to handle structured data searches. Full-text searches are used to find reports for unstructured user queries. The metadata content management system 10 typically handles full-text search by interacting with external search tools 30 (FIG. 1). For example, searches launched from Internet Information Services (IIS) or Portal text search tools are full-text searches.

The content index provides various advantages. The metadata content management system 10 enhances search and drill-through capabilities across the range of user report applications 40 without requiring drill-through authoring in source content. A report author simply publishes target reports and lets the metadata content management system 10 find drill locations to the target content.

The metadata content management system 10 organizes business oriented metadata content in ways that are more relevant and meaningful to users. The metadata content management system 10 also includes several personalization and administration options.

The metadata content management system 10 describes data using names and labels from actual reports. These names are often more familiar and relevant to report users. The metadata content management system 10 also provides enhanced report-to-report drilling and product-to-product navigation. It expands the number of places where report users can "drill-to" and "drill-from" in a report. Most drilling requires no advance authoring. The metadata content management system 10 improves the capabilities of search tools. This includes the concept of 'federated' search across a variety of portal and web search indices.

User reporting applications 40 often generate authored relational and OLAP reports. Those reports provide a wealth of new metadata, including schema information, that is largely hidden from other tools and reporting applications. The metadata content management system 10 exposes this metadata in a standard format that can be re-used by other CPM applications 40 and tools 30.

Figure 2A:
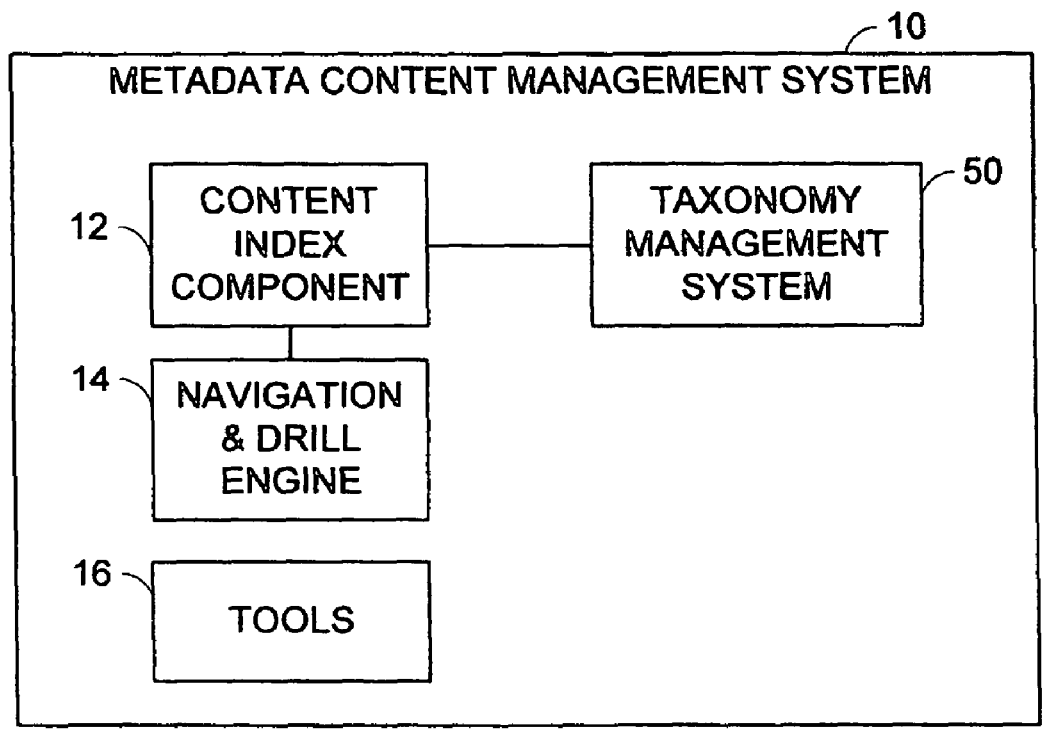
FIG. 2A is a block diagram showing an embodiment of the metadata content management system.

FIG. 2A shows an embodiment of the metadata content management system 10. The metadata content management system 10 has a content index component 12, navigation and drill engine 14 and tools 16.

The metadata content management system 10 uses indexing so that the metadata content can be searched and organized in real-time. Indexing is normally performed by the metadata content management system 10 when the metadata content is published or updated. Indexing can be performed by a scheduled administrator task (example: nightly cron job). It can also be performed manually by an administrator or user.

Figure 2B:
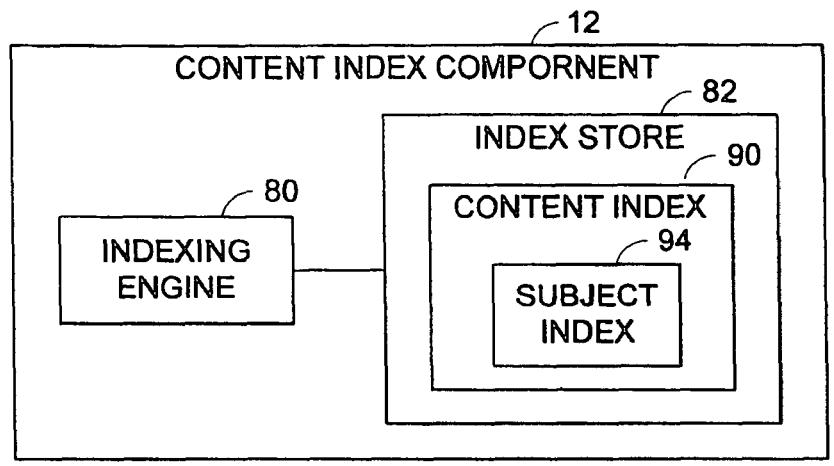
FIG. 2B is a block diagram showing an embodiment of a content index component.

As shown in FIG. 2B, the content index component 12 has an indexing engine 80 and an Index store 82. The index store 82 stores files for content index 90. The content index 90 may also be called an index corpus or knowledge base. The content index 90 is a full-text index.

The indexing engine 80 performs indexing of the content of the business oriented metadata 20 for a particular organization. It analyzes the content of the business oriented metadata 20 and creates indexes as described below. Since it creates indexes from the business oriented metadata of the organization, the created indexes are suitable for the organization.

A single set of index files is typically maintained in the index store 82 in the content index component 12 for all users and user groups for the organization. By storing a single set of index files in a single store, the metadata content management system 10 can provide optimal or improved performance. The index store 82 may be part of a server file system of the organization.

A content index 90 is a collection of content indexes. In other words, the content index 90 is a concordance of unique words (called terms) across scanned or indexed content items (called documents). Each content index contains an entry for each term across the indexed documents. Each context index catalogs individual words or terms and stores them along with their usage or other data. Each indexed content term contains a list of the indexed documents that have that term. Each indexed content term also contains usage statistics and the position of the term within each indexed document where possible. A content index is an "inverted index" where each indexed term refers to a list of documents that have the indexed term, rather than each indexed document contains a list of terms as in traditional indexes. The content index 90 provides term searches and links to additional data stored in the content index 90. Each content index may contain, for each content, i.e., target item, information regarding the name or identification of the target item; module, cube or report metadata and their relevant metadata hierarchy; item location in the document folder hierarchy; and/or reference to its dependent model.

A content index may be an XML content index that describes each indexed item in XML. An XML content index stores applicable metadata, metrics and planning information that improve search relevance. Each XML content index is associated with each indexed document. An indexed document is an XML file that catalogs metadata, report values and other reporting application-specific information.

The XML content index items or data are stored in flat files in the index store 82. The index store 82 may be the application server's file system. A relational database can optionally be configured to store this XML content index data. "Read" activity related to XML content index items is low compared to typical full-text index items. Records of XML content index items are read by search tools 30 after a list of preliminary search results has been made by the navigation & drill engine 14, as described below.

While FIG. 2B shows the index store 82 within the content index component 12, the index store 82 may or may not be part of the metadata content management system 10.

The content index 90 may be stored in application server flat files. The content index 90 is typically optimized to minimize disk reads and keep term storage as low as possible. The content index 90 may be stored in a data store of an external full-text search engine. For example, the metadata content management system 10 may use an implementation of an existing full-text engine, e.g., the open source Apache Jakata Lucene full-text engine.

The content index 90 also includes a taxonomy or subject index 94. The subject index 94 may also be called a subject hierarchy, topic hierarchy, topic tree or subject dictionary. The subject index 94 is a collection of indexes, each being a file-based index extension that allows subject hierarchies or taxonomies to be quickly queried. The subject index 94 allows searches of parent topic names for a given term, as further described below.

The navigation and drill engine 14 is a server component that analyses each user's "context" within their active reporting application 40. The navigation and drill engine 14 processes drill requests and text searches. When a drill request is received from a reporting application 40, the navigation and drill engine 14 extracts unique words or terms from the search context of the request. An example of search bar "text" and the resultant search context is shown in FIG. 15.

The navigation and drill engine 14 passes these unique terms to a full-text search engine, which returns a list of matching documents. The metadata content management system 10 may have a full-text search engine, or may use an external full-text search engine.

The navigation and drill engine 14 may apply a security check to this list of results returned thus far. The navigation and drill engine 14 may send batch or grouped security queries to the appropriate target reporting application 40. Denied items are removed from the results list.

To improve the result relevance, the navigation and drill engine 14 may also score the documents using the content index entry for each item. The content index entry may be retrieved from a flat file storing the relevant content index or the linked relational database. The navigation and drill engine 14 may use the original source context to establish the user's position with the reporting application 40, or to establish the subject/term relationship of the request. The navigation and drill engine 14 may apply several queries and optimizations over the index content to select relevant content, such as cubes with best dimension and category matches, reports with best matching of columns, groupings and/or values, and/or prompted reports with the best matching prompts. The navigation and drill engine 14 automatically generates dynamics filters that navigate the user into a matching cube. Also, the navigation and drill engine 14 automatically generates prompt answers for prompted reports, using any item with a significant number of matching terms, and priority given to those terms listed in the taxonomy of subjects/terms.

The navigation and drill engine 14 returns the drilling results to the reporting application 40. An example is shown in FIG. 16. The results may be sorted by relevance (score) or by groups, such as "reports with matching prompts" or "cubes with matching dimensions".

The functions of the navigation and drill engine 14 are further described below using examples.

The navigation and drill engine 14 may be a Java-based server component. The navigation and drill engine 14 may use a unique security algorithm or method to ensure that users see only the results they are authorized to access. The metadata content management system 10 validates its search results against the referenced reporting application 40. A user only sees items that the user has permission to access. Each reporting application 40 allows different levels of access. The navigation and drill engine 14 may send security queries to the relevant reporting applications 40 to determine security criteria set by the applications 40.

Tools 16 provide various features. Tools 16 allow integration with search tools 30 and portals. Administrators may access to the components of the metadata content management system 10 using tools 16 via a web browser.

As shown in FIG. 2A, the metadata content management system 10 also has a taxonomy management system 50. The metadata content management system 10 provides searchable metadata and report data in a form of knowledge base documents 54 (FIG. 3) in the content index component 12 using the taxonomy management system 50.

The business taxonomy management system 50 is used for building a searchable content index or index corpus 90 that includes subject index 94 containing business taxonomy definitions obtained from the structure of business reporting metadata. A taxonomy is a hierarchy of topics or subjects. A taxonomy may also be called a subject index, subject hierarchy, topic hierarchy, topic tree and subject dictionary. The business taxonomy is used to classify terms and phrases. The taxonomy lets search components 30 find terms within a given subject or topic. The taxonomies improve many search engine functions including search results relevance, refinement of search criteria and creation of related business reporting content.

It is typically desirable to store the subject index 94 and the content index 90 together. By doing so, the metadata content management system 10 can allow the content index 90 to dynamically produce subject index 94, i.e., subject hierarchies, by searching the content index 90 for, e.g., "parent term relationships" of any word or phrase. This is possible because for a given word, the content index 90 stores references to its parent or parents. A word may have multiple derivations.

An example of a taxonomy is described for a system in which the term "Cost" is used as a Measure with names: Billing Cost, Average Billing Cost, Average Billing Cost per Customer, Average Billing Cost per Product, and Actual Cost. Also, it is used as a Report Columns/Heading with names: Product Cost, Planned Total Cost, and Cost of Goods Sold. In a "taxonomy-aware" system, any of these subjects can be used to help find more relevant results for the otherwise ambiguous term "Cost".

Figure 3:
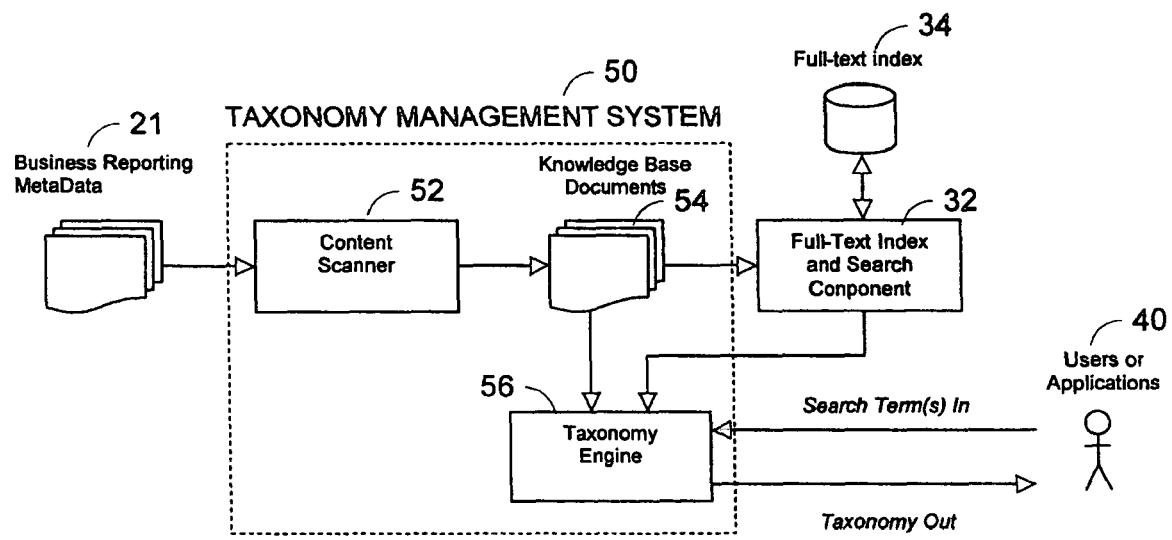
FIG. 3 is a block diagram showing an embodiment of a taxonomy management system.

As shown in FIG. 3, the business taxonomy management system 50 comprises three main components: content scanner 52, knowledge-base documents 54, and taxonomy engine 56. The content scanner 52 may be part of the indexing engine 80. The knowledge-base documents 54 form the content index 90, which in turn is used to define the subject index 94.

External components which interact with the main components are business reporting metadata 21, full-text index and search component 32, and end-users or reporting applications 40 that provide search terms and consume taxonomy responses. While FIG. 3 shows business reporting metadata 21 only as source metadata, the taxonomy management system 50 may also use other business oriented metadata 20.

FIG. 3 shows the flow of information between these components.

The business taxonomy management system 50 uses the structure of business reporting metadata 21 to create a living, de facto taxonomy definition of topics for a given business entity or organization, as described below. This taxonomy defines how terms are used in the business by the organization. The business reporting metadata 21 is metadata that exists anywhere in a given business or organization. The business reporting metadata 21 typically includes OLAP and dimensional business data. The business taxonomy management system 50 obtains the business topic structure from such OLAP and dimensional business data. For example, the business reporting metadata 21 may be derived or extracted from reports and other documents as described above. Reports and other documents are metadata documents, i.e., documents containing business oriented metadata, that define query, layout, labeling and annotation of other content. Examples of metadata documents include business reporting and analysis metadata documents authored with report authoring and creation tools, such as business intelligence application suites; business modeling and optimization metadata documents; budgeting, planning and forecasting metadata documents; and financial consolidation metadata documents.

The source business content or business reporting metadata 21 contains topic hierarchies. The business taxonomy management system 50 extracts information of the structure of the topic hierarchies from the source business reporting metadata 21. The business taxonomy management system 50 creates taxonomy definition of topics automatically without human intervention based on the structure of the topic hierarchies in the business reporting metadata 21. It uses a deterministic algorithm or method that provides reliable results without the need for complicated and potentially inaccurate linguistic analysis. For example, the business taxonomy management system 50 performs parent subject determination by examining "is a" relationships (i.e., parent/child relationships) found in the topic hierarchies that exist in the source business content 21. The business taxonomy management system 50 stores and maintains the created taxonomy definition of topics, e.g., parent/child relationships, in knowledge base documents 54.

The business taxonomy management system 50 uses simple linguistics common processes for synonyms, stemming and morphology. For synonyms, the business taxonomy management system 50 changes word to more common or popular equivalents, e.g., obtuse becomes veiled. For stemming, the business taxonomy management system 50 removes plurals and other word extensions to find base words, e.g., accessories becomes accessory. For morphology, the business taxonomy management system 50 changes words to find more common embodiments, e.g., acceleration is a common embodiment of to accelerate. The business taxonomy management system 50 does not use any complicated and unreliable linguistics processes.

The full-text index and search component 32 uses a full text index 34. The full text index 34 is a concordance of terms across the scanned or indexed documents. An entry is made for each scanned word (excepting, e.g., stop words which are too common to be useful) that lists the exact position of each occurrence of the word within corpus of documents. From such a list, it is relatively simple to retrieve all the documents that match a query, without having to scan each document. The full-text index and search component 32 provides users and applications 40 with interfaces to build and search its full text index 34.

Users or applications 40 are consumers of the taxonomy management system 50. Users or applications 40 may be referred to as operators hereinafter. The user applications 40 may be web browsers.

The content scanner component 52 reads documents containing business reporting metadata 21. It builds a knowledge-base representation of the business reporting metadata 21 with one or more of details, such as the unique document identifier, document date, structured hierarchy of reporting elements from the source document, database queries used in each structured reporting element, and linkages to other structured reporting elements in this document and other business reporting metadata documents. Typical examples of the structured hierarchy of reporting elements from the source document include data grouping, headings and labels, and other structure information often available in OLAP and dimensional business data. Each reporting element provides an identification, e.g., a display name, used in the reporting elements produced by the source metadata.

The content scanner 52 builds or updates a knowledge-base document 54 for each source metadata document containing business reporting metadata 21. A knowledge base document 54 is used to store a knowledge base representation of each term in the each source metadata document along with references to content of the metadata 21 that uses the term.

In this system 50, a knowledge-base document 54 is encoded in Extensible Markup Language (XML) and stored in system data files. In a different embodiment, any storage or encoding mechanism can be used. For example data may be stored in database records and accessed with SQL.

The content scanner 52 may use logical folders and directories where content is stored to classify the source metadata documents contained in those logical folders and directories. The content scanner 52 may use an index and search functions file while scanning the source metadata documents. As the source metadata documents are scanned, the content scanner 52 collects primary metadata hierarchies by adding target holders or items to the index and search functions file, and weights the metadata found in these items higher than metadata found elsewhere. For example, the terms and descriptions used in logical folder/directory names can be weighted to have higher importance that another data, such as OLAP dimension or relational table names.

The content scanner 52 may define subject "is a" hierarchies or parent/child relationships existed in the source content, such as OLAP cube dimension trees, model entity trees, sample value enumerations for any arbitrary model entity item and folder structures. OLAP and relational data are primary sources of high quality subject hierarchies data. Sample value enumerations are extensions to these OLAP and relational sources. Sample value enumerations may be databases to queried to get "examples" of subject data. For example, the content scanner 52 can find that a "Yosamite Dome Tent" is a "Product". The content scanner 52 captures terms for query item sample value enumerations by running the related model queries.

The content scanner 52 stores these "is a" hierarchies in the subject Index 94 (FIG. 2B) in the knowledge base documents 54 that allow them to be found with standard full-text searches by the full-text index and search component 32, as described below. The content scanner 52 may define subject hierarchies as full-text terms referencing a special XML content documents called subject index documents or knowledge base documents 54. The XML in a subject index document refers to the definition of the subject phrase.

A full text search for terms returns relevant subject index documents in the knowledge base documents 54. For example, searching for term "binocular" returns subject index documents "Product" and "Outdoor Gear" indicating that binocular is "is a" kind of Product and "is a" kind of Outdoor Gear.

The content scanner 52 indexes words and phrases to create a virtual "hierarchy of topics". For example, the content scanner 52 indexes the following hierarchies in each type of content:

| Content Type | Index Hierarchy |
| --- | --- |
| OLAP cubes | Every word in every dimension/category tree and their relationship to parent dimensions/categories |
| Models | Every word in every package/folder tree and their relationship to parent packages/folders. |
| Report Specifications | Every word used in titles and labels. Model query items used in the report are expanded to index the text in the query result (these results are called "Sample Value Enumerations"). |
| Cognos Connection (TM) Items | Every word in every folder and item along with their relationship to parent folders |

For example, for OLAP cubes, the content scanner 52 indexes the entire dimension tree. Each word in each folder (dimension/category) and all contained element names are indexed, including content of all collapsed folders in this example. The relationship of terms to parent folders is also indexed. In this example, "products" is indexed as a parent of "accessories" child term. "accessories" is indexed as a parent of "headphones". The "order method" is indexed as a parent of terms "sales" and "visit".

For report specifications and models, the content scanner 52 indexes each word in each display name, title and label. The content scanner 52 also indexes query subject/query item hierarchy in models. Each query item referenced in a report is expanded to get an index of text values. In this example, all tree relationships are indexed in the same fashion as cubes and folders. Query items like "product line", "product type", "product name" and "description" are expanded. The resulting text values and their relationship to their parent query item is indexed. The content scanner 52 stores these indexed words and items in the knowledge base documents 54.

Each knowledge-base document 54 is consumed by the full-text index and search component or engine 32 which adds a reference back to the knowledge-base document 54 for each term found in the document. The full-text index 34 is subsequently used by the full-text index and search engine 32 or other search tools to retrieve knowledge-base documents 54 that contain specified search terms.

The taxonomy engine 56 provides taxonomy services to users and other applications 40. When one or more search terms are provided by a user or application 40, the taxonomy engine 56 provides the taxonomy of the given search terms to the user or application 40. The taxonomy may include indexed terms that are parent topic terms, sibling topic terms and descendent or child topic terms of the given search terms. The taxonomy engine 56 creates the taxonomy dynamically for each search term provided using the knowledge base documents 54.

FIG. 4A shows the procedure for determining parent topic terms from a given term received from the user or application 40 (100). The taxonomy engine 56 uses the full-text and search engine 32 to find knowledge-base documents 54 that contain the given term (102). The taxonomy engine 56 finds structured elements in the matching documents 54 where the given term is used (104). The taxonomy engine 56 gets all structured parent elements relative to the structured element for each matching term (106). For a given word, the knowledge base document 54 stores the word and all references to its parents in the subject index. The taxonomy engine 56 uses these references to parents to locate relevant structured parent elements. The taxonomy engine 56 then returns a list of the identification of the located structured parent elements, e.g., a list of display names from the elements found across all matching documents 54 (108).

FIG. 4B shows the procedure for determining sibling topic terms from a given term received (110). The taxonomy engine 56 uses the full-text index and search component 32 to find knowledge-base documents 54 that contain the given term (112). The taxonomy engine 56 finds structured elements in the matching documents 54 where the given term is used (114). The taxonomy engine 56 gets all structured sibling elements relative to the structured element for each matching term (116) using the subject index containing references to parent relationships in the matching documents 54. To find siblings, the taxonomy engine 56 searches for other words with the same parents as the current word. The taxonomy engine 56 returns a list of identifications of the located structured sibling elements, e.g., the list of display names from the elements found across all matching documents 54 (118).

Figure 4C:
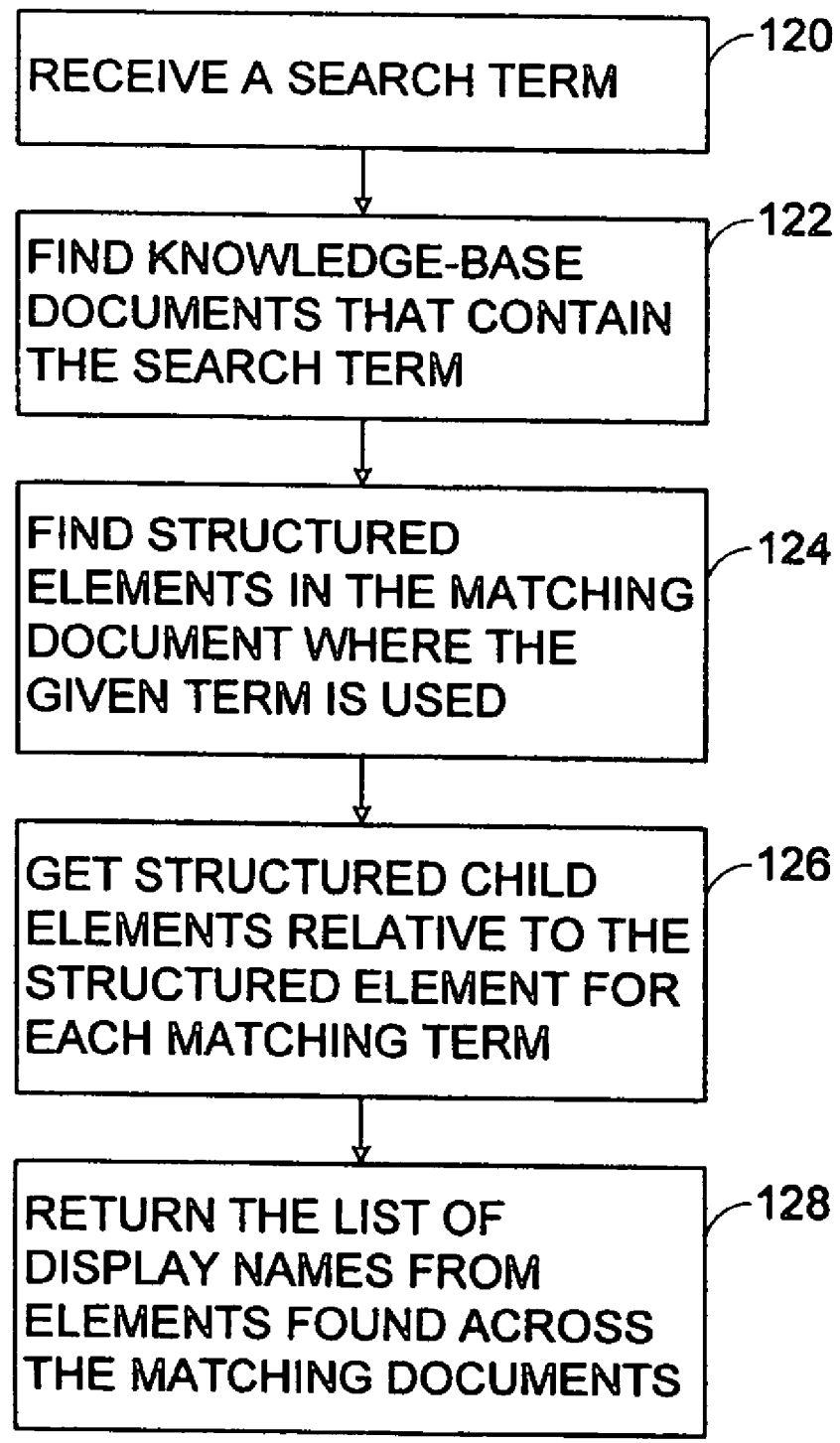
FIG. 4C is a flowchart showing an embodiment of the procedure for determining child topic terms.

FIG. 4C shows the procedure for determining Descendent child topic terms from a given term received (120). The taxonomy engine 56 uses the full-text index and search component 32 to find all knowledge-base documents 54 that contain the given term (122). The taxonomy engine 56 finds structured elements in the matching documents 54 where the given term is used (124). The taxonomy engine 56 gets all structured child elements relative to the structured element for each matching term (126) using the subject index containing references to parent relationships in the matching documents 54. To find children, the taxonomy engine 56 searches for other words with this word as a parent. The taxonomy engine 56 then returns a list of identifications of the located structured child elements, e.g., a list of display names from elements found across all matching documents 54 (128).

Other embodiments may include building taxonomies with "Crawler Task" that performs functions of the content scanner 52, or building knowledge-base documents or corpus 54 with dedicated tools instead of content scanner 52. A crawler task is an embodiment of a web crawler. Also, other embodiments of the taxonomy management system 50 may use a relational database for the knowledge-base corpus 54.

The taxonomy engine 56 provides taxonomy searching or lineage searching that allows the parent subjects for any given term to be determined with a single full-text query. Taxonomy search results allow metadata names to be found for input terms that are values. Taxonomy searching is not based on linguistics or natural language processing. The relationships are extracted from actual metadata hierarchies in the source metadata documents as described above. Full-text indexing makes retrieval feasible.

Taxonomy searching allows quick finding of metadata names and descriptions that contain a given search term. Also, search terms can be quickly associated to metadata. Subsequent metadata searches allow compatible drill targets to be found. Search term values can be passed to a drill target with matching metadata. There is reasonable assurance that term is a valid parameter. Search terms can be broadened to a parent topic phrase, allowing very accurate "see also" topic lists.

When taxonomy searches show that a term has multiple parent topics, the taxonomy engine 56 may use a navigation mechanism to narrow searches to a specifics topic. For example, the taxonomy engine 56 can show subject data as folder trees or other appropriate hierarchical visual aids to help a user select relevant related topics. When selected, these topics can be used to filter or narrow search results to include a subset of results based on the chosen topics. The taxonomy engine 56 may use reference counts to pick the parent topic with the largest number of child references. It may also use other links, such as "see also" links.

The taxonomy management system 50 may provides APIs that enables implementation of these features of the taxonomy engine 56.

In a different embodiment, the content scanner 52 may be combined with a full-text index scanner that indexes terms, determines example terms in one integrated component. A sophisticated embodiment of a full-text index and search service may integrate itself with the example component or engine 62.

The full-text index and search components 32 are search engines that index content by "crawling" through content. Examples include Google™ Web Server, Google™ Desktop Search, MSN™ Web Search, MSN™ Desktop Search and other enterprise search tools.

The operators 40 are operators who issue search requests against the taxonomy engine 56, view results and navigate to referenced business reporting metadata 21.

Figure 5:
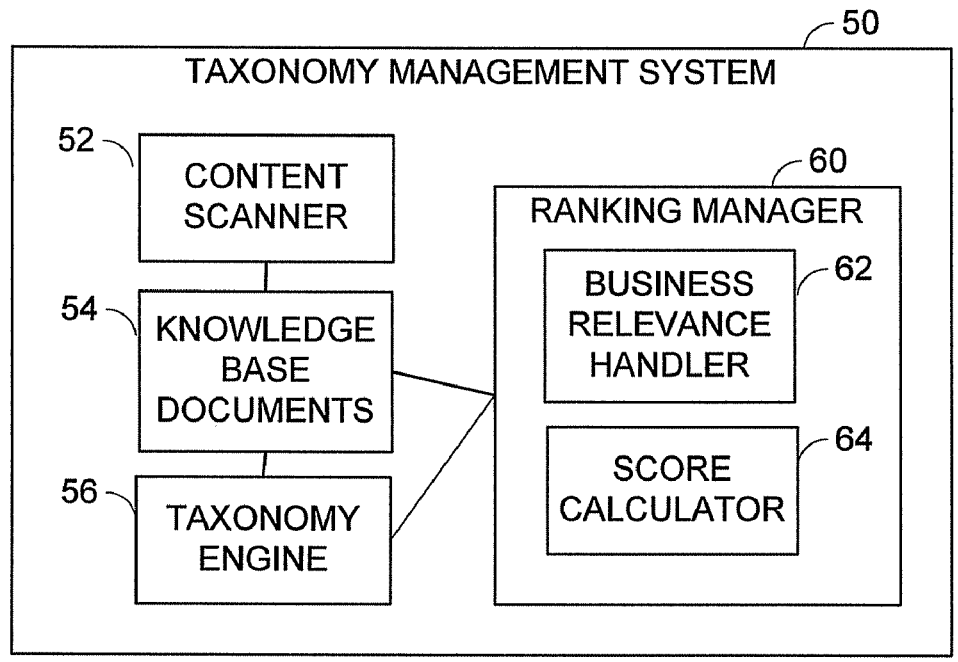
FIG. 5 is a diagram showing another embodiment of the taxonomy management system.

As shown in FIG. 5, the taxonomy management system 50 may also have a ranking manager 60 for managing relevance scores for search results. The ranking manager 60 has a business relevance handler 62 and score calculator 64.

The business relevance handler 62 handles assignment of weights or base scores to individual metadata elements depending on their "relevance to the business". The business relevance handler 62 determines the "relevance to the business" using data in the knowledge base documents 54. For example, the business relevance handler 62 may determine a base score of a metadata element based on its metadata type, parent metadata type, uniqueness of metadata element, usage of a target by other users, subscription to target by other users, running/compiling a target, and/or publish and update date of a target.

The score calculator 64 calculates a relevance score for each search result item by aggregating base scores assigned to individual metadata elements included in the search result item.

Examples of operations of the metadata content management system 10 are now described.

The metadata content management system 10 indexes the key elements of each report and other business oriented metadata 20, and maintains a searchable database of reports and other metadata 20, in a form of content index 90 or knowledge based documents 54. This database 90 is optimized for efficient searching of metadata names and hierarchies. It also offers searching of text. This information is used to provide the metadata content management system 10 drilling features. The metadata content management system 10 populates full-text search engines (like the Google™ Intranet "Search Appliance") with information about each report and other business oriented metadata 20. It allows these search engines to find relevant content of business oriented metadata 20.

Searching functions and the user interface of the metadata content management system 10 are now described. Searching functions are launched internally in reporting applications 40 using a specified user interface. Alternatively, search may also be requested by any reporting application 40 with the URL, e.g., http://hostname/crn/xxxxxx?c=search&q=p1\p2\p3 . . . &e=y&u=y&r=g&back=backURL; where q=p1\p2\p3 . . . represents any number of arbitrary search terms separated by "\"; e=y shows search edit field with current terms (for refining search); u=y is used when clicking hyperlinked results, launch in separate window; r=g shows grouped results (default is list results); and backURL shows a return address.

The content management system 10 preprocesses query text by evaluating terms of the query text to determine if they are a member of a topic hierarchy. Product, date, location and customer categorizations are often members of a topic hierarchy. The system 10 "stems" words to find their base. For example, "Accessories" becomes "accessory". "Dates" becomes "date". The system 10 assigns each word in the query text an initial weighting score. The system 10 weighs original terms incrementally higher than the stemmed terms, and incrementally higher than related parent topics. The system 10 also weighs terms found indexed incrementally higher than other terms. The system 10 uses these terms and their associated weights to build a query specification which is used by the index search function of the system 10.

A search example is described for search terms: "2005 tent sales". The taxonomy engine 56 performs an initial lineage search or taxonomy search which indicates that "2005" is a date and "tent" is a product. Any reports that use these metadata elements become search targets. Prompts with matching metadata types, matching names in cubes and matching filter specifications that will allow dynamic positioning in the cube also become search targets.

A drilling example is now described. The user application 40 displays on screen context or a list of relevant items that includes the titles and labels of the searched targets along with the model query items used to produce the current page and/or selected items. When the user requests drilling from this displayed context, the metadata content management system 10 searches for reports/cubes with the related metadata using values shown on the screen. The system 10 may also use topics and terms related with the displayed context to encompass parent topics. The search result is a high likelihood that all matching modeled elements and same-named display elements are found for the target that deals with related content.

Figures 17, 18, 19:
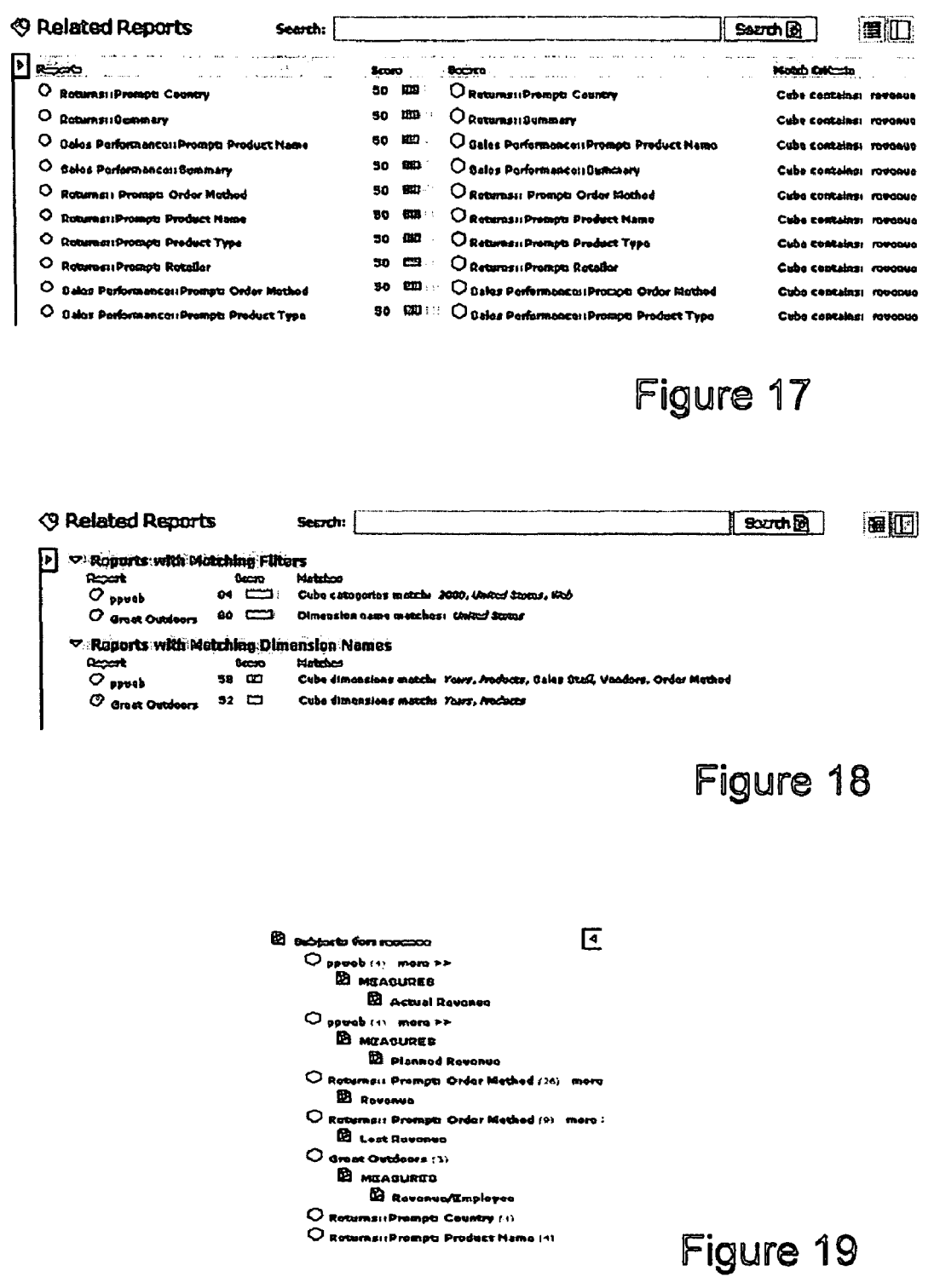

Search results are now described. Search results are typically shown as line items in list format, sorted by relevance score, as shown in FIG. 17. The user can click a name to launch its matching item, click a group button to show grouped results, or click an arrow button in frame on left to show Related Subjects. The result display also has the search query edit field, which is optional.

Grouped results show search results organized by match criteria with inner sort by relevance score, as shown in FIG. 18. The user can click name to launch matching item, click a list button to show list results, or click an arrow button in frame on left to show related subjects.

The subjects pane shows how the current search terms are used in the index, as shown in FIG. 19. The user can click subject name to refine the current search with a matching item, or click an arrow button to hide this pane.

Results line items include:

1. Hyperlinks that are used to launch referenced target content.

2. A relevance score shown graphically or as text. Result line items are usually sorted by this score value.

3. Text describing metadata matches for this target.

4. Any other text, links or graphics that help a user understand the relevance of the referenced target.

The relevance score for each line item is uniquely calculated as a weighted aggregate score based on the metadata elements matched. Base scores for matching metadata elements are added together to create a score for each item.

Metadata elements are assigned different base scores rooted to their "relevance to the business". Elements with higher base scores will cause result line items for a target to ultimately have a higher aggregate score.

"Relevance to business" includes the following criteria:

1. Metadata type. Types like prompts, headings, column names can cause the base score to be affected.

2. Parent Metadata type. The metadata type of a parent in the index taxonomy hierarchy can cause the base score to be affected.

3. Uniqueness of metadata element. Elements that occur more frequently can cause the base score to be affected.

4. Usage of a target by other users. When more people use a target report/content, the base score can be affected.

5. Subscription to target by other users. When more people subscribe to a target report/content in some manner, the base score can be affected.

6. Running/compiling a target. When a target is run or compiled in some manner, the base score can be affected.

7. Publish and update date of a target. The date that a target was initially published or changed can cause the base score to be affected.

In order to provide drill-through functions, the metadata content management system 10 may provide an HTML user interface that can be launched via URL: such as http://hostname/crn/xxxxxx?d=<xml/>&u=y&r=g&back=backURL, where d represents "XMLEncoded" XML Drill specification providing source content, u represents Value 'n' (default) specifies that hyperlinked results should be opened in the same window. Value 'y' specifies that hyperlinked results should be opened in a separate window. r shows grouped results (default is list results), and back provides "URLEncoded" return address. Drill-through functions may also be launched internally in reporting applications 40.

Examples of drilling and linking functions available using the metadata content management system 10 are now described.

Metadata drilling is feasible when a match can be found between an item selected in one application and the metadata exported from another report. The metadata content management system 10 significantly expands the number of possible metadata values. Therefore, the number of potential drill targets is increased.

Figure 7:
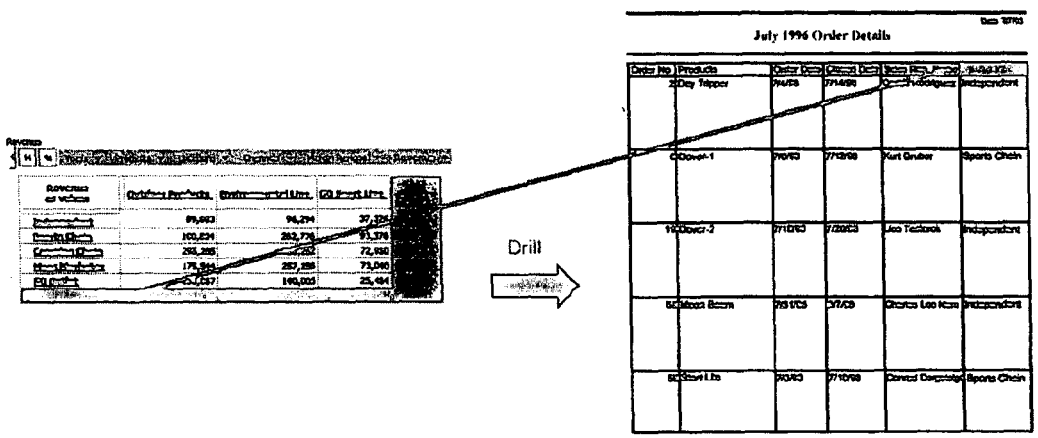
FIG. 7 is a diagram showing an example of a report and user interface display by the metadata content management system.

For example, as shown in FIG. 7, the dimension name "Channels" in the Cognos PowerPlay™ cube on the left is used to match a column name in the report on the right. This drill example illustrates that by using the metadata content management system 10, drill targets can be determined dynamically at run-time. This differs from existing CPM tools where drill targets need to be specified when a report is being authored.

Figure 8:
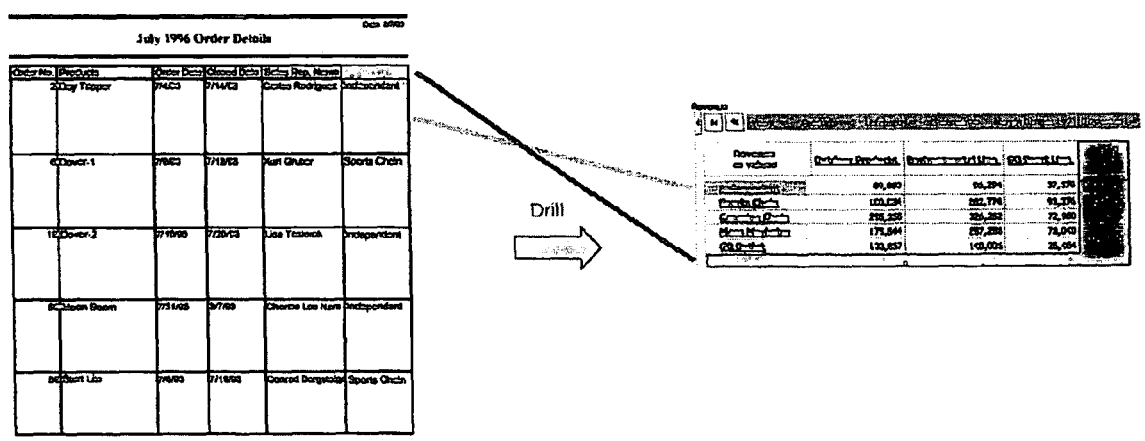
FIG. 8 is a diagram showing another example of a report and user interface display by the metadata content management system.

The metadata content management system 10 provides metadata drilling that allows applications 40 to drill in any direction by dynamically determining drill targets at run-time. Metadata searches allow the user to drill in "non-traditional" ways. For example, it is possible to drill from reporting applications. As shown in FIG. 8, the column name "Channels" in a report on the left is used to match a dimension name (or any star schema element) in a cube on the right. Optionally, the selected "Independent" channel name on the left can be used to link to a category name on the right.

Meta drilling allows content to be linked using metadata only. Report values and measures are not needed. As such, these reports can be efficiently indexed when they are initially published. Indexing needs to be updated only when a report specification changes. No authoring is needed to drill in either direction. An example of using meta data from drilling is as follows. If a user searches for "products", the user finds all reports that have a database table or OLAP dimension that includes the base (stemmed) word "product". The user does not necessarily need to find "product" in any of the report data. If the user searches for "tents", the user can determine that the base (stemmed) word "tent" is a "product" and then finds all reports that have a database table or OLAP dimension that includes the word "product". The user does not necessarily need to find "tent" or "product" in any of the report data. By allowing content to be linked using metadata only, e.g., using hyperlinks, the system 10 can connect sources and targets.

Figure 9:
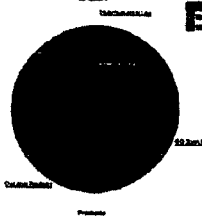
FIG. 9 is a diagram showing another example of a report and user interface display by the metadata content management system.

Meta drilling often results in multiple drill targets. The metadata content management system 10 lists the hierarchy of matches and allows a user to pick an appropriate target, as shown in FIG. 9. The metadata content management system 10 lists matching reports by report type and then sorts them by a calculated relevance rating.

The metadata content management system 10 calculates search relevance by first creating search criteria at the drill source location and then comparing this criteria with the resulting list of matching items.

Source metadata and values are used to create a search specification. For example, when drilling from an OLAP report, the metadata content management system 10 uses filter information, including the current crosstab dimension and category filters plus dimensions currently being displayed, to create a search specification.

Figure 10:
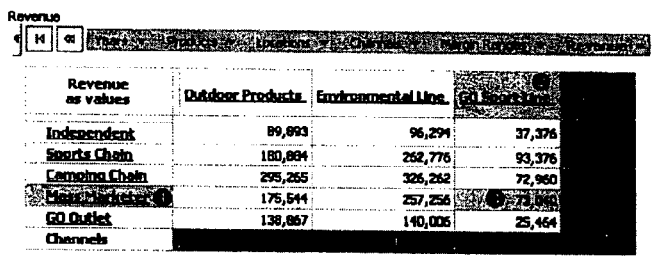
FIG. 10 is a diagram showing another example of a report and user interface display by the metadata content management system.

Consider the following drill from a report shown in FIG. 10. By drilling from the Mass Marketer category, the metadata content management system 10 builds a search specification that includes terms "looks for item Mass Marketer within Channels". By drilling from the GO Sport Line category, metadata content management system 10 builds a search specification that includes terms "looks for item Go Sport Line within Products". By drilling from the intersection of the Mass Marketer and GO Sport Line categories, metadata content management system 10 builds a search specification that includes both of the terms above.

If any additional filters are active in the crosstab, for example Years=2003 or Location=California within USA, then the metadata content management system 10 adds the related filter terms to the search criteria.

The search is submitted to the metadata content management system 10. The metadata content management system 10 calculates report relevance by comparing the number of matched terms with those found in each result item.

Figure 11:
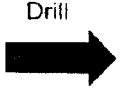
FIG. 11 is a diagram showing another example of a report and user interface display by the metadata content management system.

Value drilling and searching allows target report values and measures to be searched. This means that search criteria can include value ranges within metadata constraints. As shown in FIG. 11, the Order Number value "160" in a report on the left is used to match same Order Number value in a report on the right that is generated by a different reporting tool.

Value searching allows content to be linked using metadata and associated report values/measures from actual reports. This type of drilling allows extends the number of reports that can be matched at the cost of using more index storage. It is also much slower than searching only metadata. As such, value searching is typically not a good choice for drilling. It is better suited for ad hoc searching where speed is less of a concern.

Examples shown thus far have concentrated on report-to-report "drilling". The metadata content management system 10 also provides full-text searches against metadata 21 and values 22.

The metadata content management system 10 allows enterprise search tools 30 to be used to expose BI content of supported reporting applications 40 to report users. External full text search engines use proprietary technology to index content. The metadata content management system 10 "pushes" or populates index values to each supported external search engine. Search indexes are maintained by a search server associated with each external search engine. Storage requirements are dependent on the amount of information provided by metadata content management system 10. The metadata content management system 10 may have configuration options that control how much information is "pushed" to these servers. The metadata content management system 10 typically maintains its own index that can be used standalone or in conjunction with the external search engines. The result is fast, relevant and predictable searches.

The metadata content management system 10 may also allow applications to create lists of "see also" links that show related content.

The metadata content management system 10 facilities are preferably exposed as WSDL compliant Web Services.

Figures 12, 13, 14:
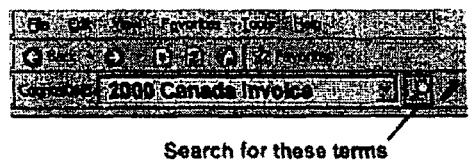
FIG. 12 is a diagram showing another example of a report and user interface display by the metadata content management system.
FIG. 13 is a diagram showing another example of a report and user interface display by the metadata content management system.
FIG. 14 is a diagram showing another example of a report and user interface display by the metadata content management system.

Another example is described using a report generated using Cognos PowerPlay™ to describe how a list of search results of the metadata content management system 10 is produced. In this example, a user wants to find related CPM content. The user initiates his "search" by launching a dynamic "drill" from inside a Cognos PowerPlay™. The user presses the metadata content management system 10 "Drill" button, or enters terms in the metadata content management system 10 "search bar". FIG. 12 is an example from Cognos PowerPlay 7.3™ showing the "Drill" button. Alternatively, as shown in FIG. 13, the user can type terms in the text search tool or browser search bar.

The navigation and search engine 14 accepts request and builds a "Source Context". This is carried out as follows. The navigation and search engine 14 starts the actual index search. When drilling from a reporting application like Cognos PowerPlay™, the engine 14 extracts current filter values, view settings and all visible category information to create a "Source Context". FIG. 14 shows an example of "Drill" from Cognos PowerPlay™ and the resultant Source Context.

A "Source Context" is also built for "text" searches. The metadata content management system 10 uses the taxonomy management system 50. Individual terms are inspected to see if they match subjects in the metadata content management system subject and term hierarchy, i.e., a "taxonomy". When a match is found, terms are placed under their respective matching subjects. This allow terms to be treated like categories within OLAP dimensions.

An example of hyper-dimensional report creation is now described. Hyper-Dimensional Navigation can be also used to create reports. This example shows a sales manager who wants to compare 2005 actual sales against his forecast for Projection TVs in US and Canada with detail breakdown by Order Method.

The sales manager begins at the top level of his enterprise Navigation Bar. It shows the most frequently referenced reporting categories across the entire enterprise. While this navigation bar has literally hundreds of topics, only the top seven items for the "Sales Manager Role" are shown in FIG. 20.

As an alternative to typing search terms, e.g., "2004 United States Canada Projection TV", he simply clicks the down arrow symbol next to the related "hyper dimensional topics" shown. Under Products, he selects Projection TVs. Under Years he selects 2005. Under Distribution Channel he selects Order Method. Under Location he selects both United States and Canada. Search results show matching reports as shown in FIG. 21.

He sees that no reports match his search criteria. Now he checks the topic Plan Versus Actual and clicks Create report to answer his question. The metadata content management system 10 creates a report (using the Sales Manager business role that he selected last time) as shown in FIG. 22.

Hyper-Dimensional navigation provides a concise definition of report items needed. Business Role also helps narrow the choices without asking too many questions.

Now report extensions are described. Consider the regional sales manager for GO Sporting Goods. As part of his quarterly expense activity, he needs to know: "Which salespeople exceeded their target last year?". This user goes to his "usual" set of reports that have been authored for him. Finding nothing that would appear to directly answer his question, he open a report, entitled Sales Revenue by Salesperson. He sees it has some of the information needed as shown in FIG. 23.

Verifying that the information shown is correct and appropriate, he selects the columns of interest—in this case: Sales Year, Staff Name and Actual Revenue—and right-clicks to see available options.

As shown in FIG. 24, he selects Show related content to launch the metadata content management system 10 and find all related reports. He sees the following search results as shown in FIG. 25.

Seeing that none of the reports match his needs, he decides to extend his current report by clicking Extend Report with Related Data. He is asked to describe the extra information he wishes to see as shown in FIG. 26. He types search terms "Sales Target Exceeded" and clicks Finish.

The component of the metadata content management system 10 is started to look for models and reporting examples that match the terms "Sales", "Target", or "Exceeded". The metadata content management system 10 creates a new report specification from the model and metadata elements found. The report is run and the results are shown in FIG. 27. The generated report has new columns: "Sales target" and "Exceeds target". The sales manager got the numbers he was looking for.

Advanced users can launch a report editing/creation tool to fine tune the generated report.

The metadata content management system 10 performed this as follows. An element with a display title "Sales Target" is found in the model used most often by this user. It is deemed to be compatible with the original report's list-style format. Similarly, a calculation named "exceeds target" is found in a report that shows both actual revenue and sales target elements. This calculation is also deemed compatible. The metadata content management system 10 assembles the new report and displays the answer.

Visual Report Construction is now described. Visual Report Construction is a simple idea: A user views elements in two reports that he wants in a single report. Using a drag-and-drop gesture, he drags elements together. Visually it's a trivial drag-and-drop gesture. Under-the-covers, it is a variant of the Report Extension example shown previously.

In this example, a regional sales manager for GO Sporting Goods. As part of his quarterly expense activity, he needs to know: "Which salespeople exceeded their target last year?". Once again he goes to his "usual" set of reports and opens Sales Revenue by Salesperson. He sees it has some of the information needed as shown in FIG. 28. He opens another report, and sees it has some of the information he wants.

Dynamic Details are now described. Simple relational list reports are often created as authored drill-through targets in dimensional reporting tools, like Cognos PowerPlay™. This example shows how the metadata content management system 10 can automatically produce these reports without authoring.

In this example, a product manager wants to know who provides customer support for a particular product at different US retailers. She is familiar with Cognos PowerPlay™. She navigates to where she thinks the answer will be found as shown in FIG. 29.

Realizing that this cube lacks the detail she needs, she clicks to the Cognos PowerPlay™ drill-through button. Cognos PowerPlay™ recognizes that no authored drill-through actions exist for the selected cells, so it passes the request to the metadata content management system 10 component.

Having sufficient knowledge about the source cube location from the selected cells: Year=2004, Product=Canyon Mule Climber Backpack, Location=United States, the metadata content management system 10 asks her for two simple clarifications (which can optionally be defaulted in the future): "What business role are you currently performing?" and "What kind of details are you looking for?". She sees the page shown in FIG. 30. From the custom options shown, she selects Product Manager and Staff Details. She clicks Finish to get her answer.

The metadata content management system 10 creates and runs a detail report that matches criteria in her chosen role using the original selected cell data as query values. She sees the results as shown in FIG. 31. She verifies the report content by looking at title and column names. She sees her answer.

The metadata content management system 10 performed this example as follows. Filter information is extracted from the source Cognos PowerPlay™ report. It is combined with the caller's selected job role and detail template to create a report with appropriate content. Roles are defined by an administrator and users themselves. Detail templates are created by authoring real reports in Report Studio and optionally creating templates of the metadata content management system 10 when saving and updating.

Administration functions and user interface of the metadata content management system 10 are now described. The administration functions of the metadata content management system 10 administration are available only to users with administration capability.

Figures 32, 33:
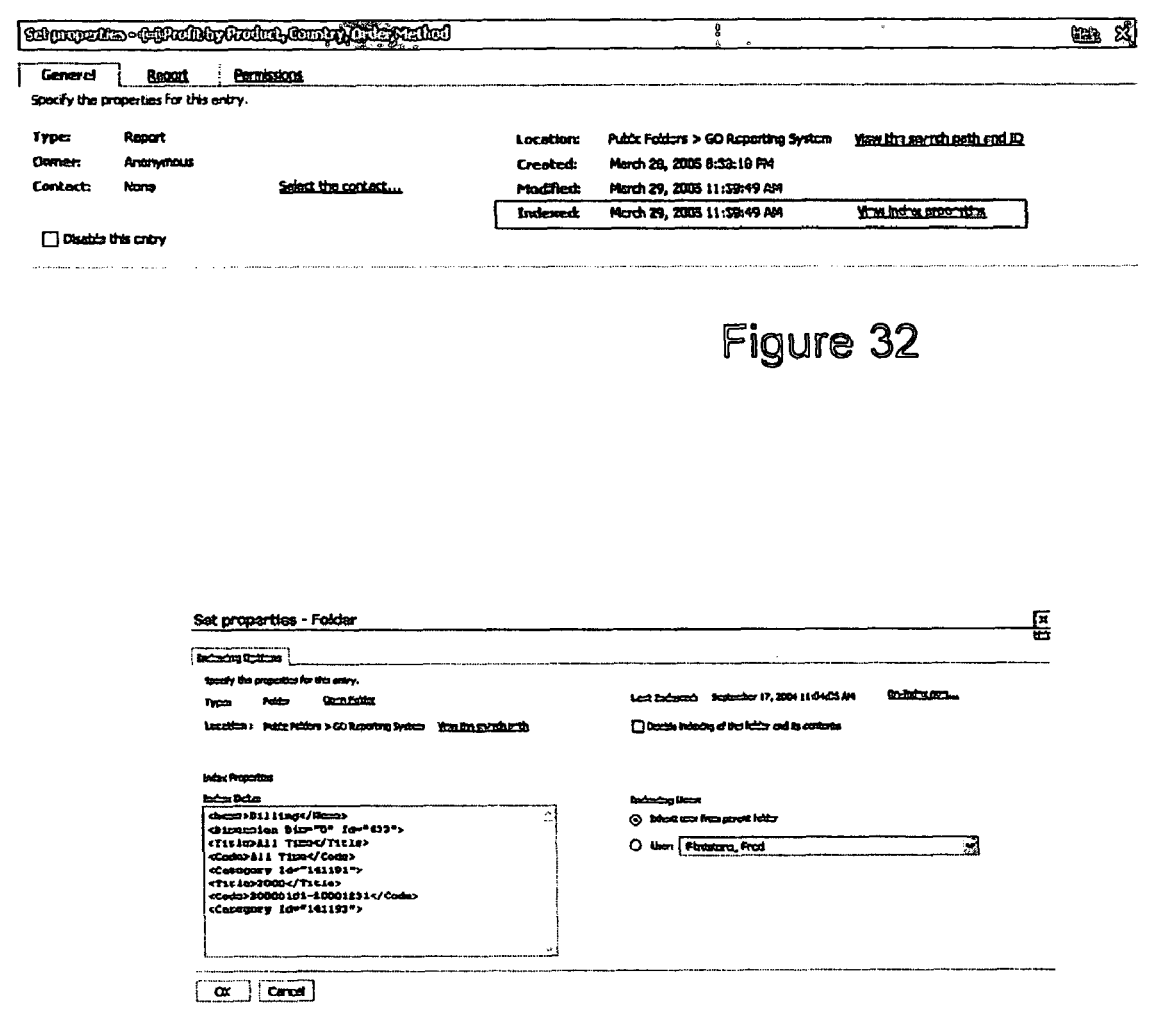

Index Properties are viewed via a link on item property pages, as shown in FIG. 32.

The item Type is Folder. The Open Folder link lets the user open the folder in a new window, as shown in FIG. 33. Last Indexed shows the date/time of the most recent indexing on the folder itself (contained items will have different dates/times). Re-index initiates indexing of the folder, then all of its content (this is a "deep index" operation—all contained folders, subfolders and items are indexed). Disable Indexing stop further indexing of this folder and all contained folders, subfolders and items. When first disabled, all contained index entries are removed. The indexing user name can be set as "inherited" (default for new items) or to a specific user. XML index data is shown (read only) OK saves changes are returns to the Index tab. Cancel returns without making any changes.

Figures 34, 35:
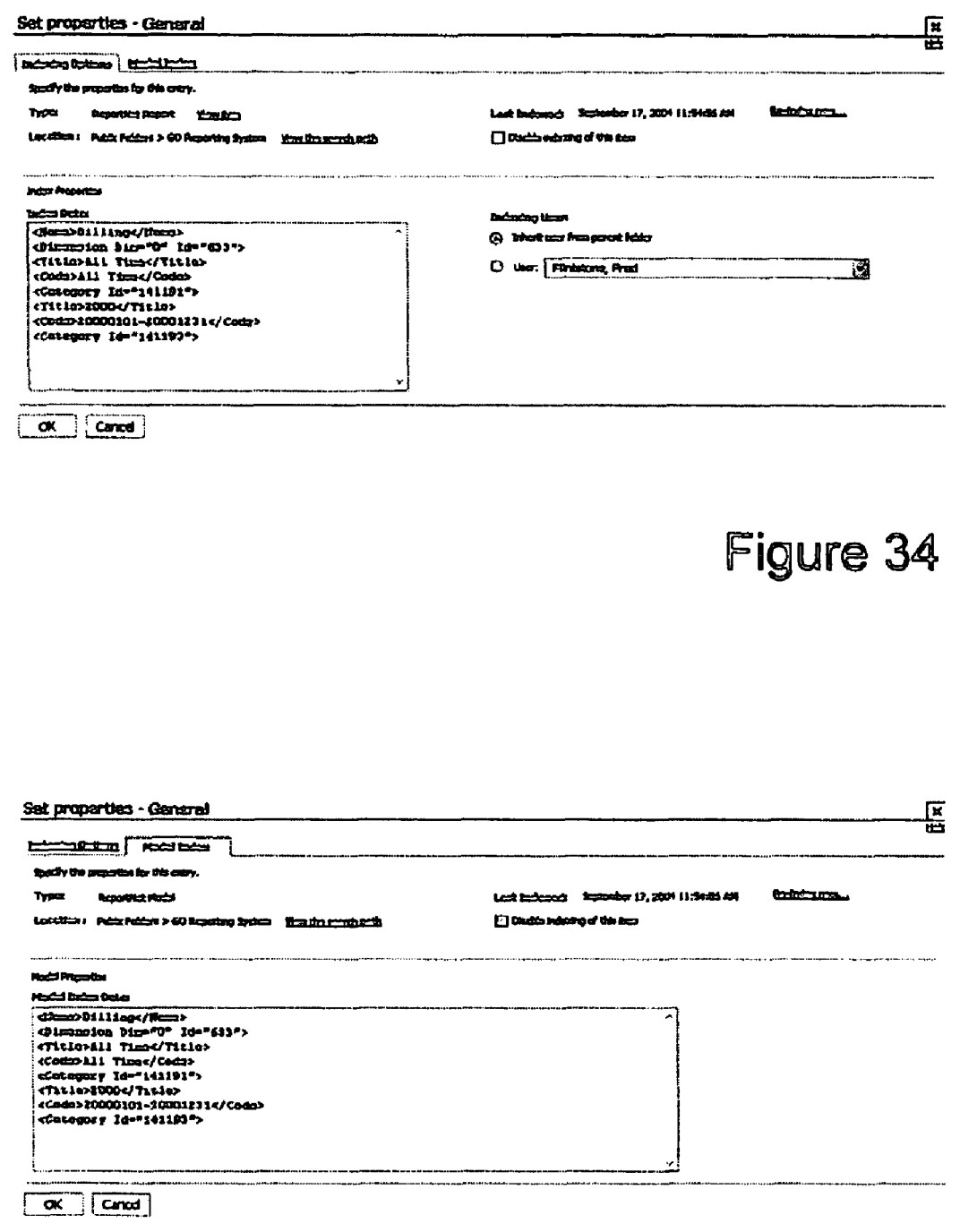

FIG. 34 shows an example of Item Property Pages. Properties for content items are the same as folders with minor label changes. It may also show a Model Index tab for a metadata model related to this report.

FIG. 35 shows an example of Model Property Pages. Properties for models items are the same as folders with minor label changes. The Model tab is shown by itself for Model list items. It is shown with an Indexing Options tab for reporting application content items (e.g., Cognos ReportNet™ content items).

General administration functions of the metadata content management system 10 can be launched from an application, such as Cognos Connection, using a link in a lunch bar. This option may be shown only to users with Content Administration capabilities.

The metadata content management system 10 finds content using simple terms and phrases. Multi-faceted navigation aids refine searches using business terminology related specifically to the customer's enterprise. When content does not t exist, the metadata content management system 10 seamlessly creates a "made-to-order" report, with the help of the customer's enterprise business terminology.

Thus, the metadata content management system 10 allow the users to find relevant BI content using simple term or phrase searches. With the help of multi-faceted navigation aids—using business terminology related specifically to a particular enterprise or organization, the users can refine searches to zero-in on the answer the users need. When content does not exist for particular search criteria, the metadata content management system 10 seamlessly creates a "madeto-order" report. Business terminology from the user's enterprise or organization helps the users refine their report to meet their requirements. Report creation is transparent.

The metadata content management system 10 allows users to search user's business oriented metadata and reporting applications. It provides a flexible "dynamic drilling" family of features, hyper-dimensional navigation, to user's applications. The "context awareness" feature allows seamless navigation to relevant related content. A search-oriented interface allows reports to be found and run easier and more efficiently. It can also use role-based reporting components in reporting applications. The metadata content management system 10 finds answers in existing reports and creates custom reports as needed. The metadata content management system 10 provides dynamic report construction. The metadata content management system 10 creates reports directly from search terms.

The hyper-dimensional navigation let users navigate their cubes and reports at a time, using the dimension metaphor of their reporting applications. Fast searching combined with intrinsic knowledge of key enterprise reporting elements allows the metadata content management system 10 to build multi-dimensional hierarchies on-the-fly. This dynamic structure is used to show a hyper-dimensional view of all enterprise content that can be navigated like a Cognos PowerPlay™ cube.

The taxonomy management system of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the taxonomy management system are described separately, however, two or more elements may be provided as a single element, or one or more elements may be shared with other components in one or more computer systems.

What is claimed is:

1. A method comprising:
   reading content of business oriented metadata included in one or more source metadata documents, the business oriented metadata including metadata representing a structured hierarchy of reporting elements;
   extracting, from the business oriented metadata, information relating to a structure of the structured hierarchy, wherein the information relating to the structure of the structured hierarchy includes one or more parent/child relationships between terms within the content of the business oriented metadata;
   defining a taxonomy of the business oriented metadata using the one or more parent/child relationships;
   building a content index of the business oriented metadata including a subject index representing the taxonomy of the business oriented metadata;
   storing the content index of the business oriented metadata; and
   providing, with at least one computer, taxonomy services to users using the content index, wherein providing the taxonomy services comprises dynamically determining one or more drill targets at run-time based on the subject index, and wherein each of the drill targets links at least two different source metadata documents.

2. The method as claimed in claim 1 wherein
   the business oriented metadata includes OLAP or dimensional business data; and
   defining the taxonomy comprises obtaining information of the structured hierarchy from the OLAP and dimensional business data to define the taxonomy of the business oriented metadata.

3. The method as claimed in claim 1 wherein defining the taxonomy comprises using an index and search functions file, and collecting primary metadata hierarchies of the business oriented metadata by adding target items to the index and search functions file.

4. The method as claimed in claim 3 wherein defining the taxonomy comprises weighting metadata found in the target items higher than metadata found elsewhere.

5. The method as claimed in claim 1 wherein
   the source metadata documents containing terms to be indexed, and
   building the content index comprises building the content index to include, for each term in each source metadata document to be indexed, a unique document identifier, a document date, and at least one of one or more database queries used in structured reporting elements of the source metadata documents, one or more linkages to other structured reporting elements in the source metadata document, and one or more linkages to other structured reporting elements in other source metadata documents.

6. The method as claimed in claim 1 wherein
   the source metadata documents contain terms to be indexed, and
   building the content index comprises building, as the content index, a knowledge base document for each term in each source metadata document to store a knowledge base representation of the term along with one or more references to content of the business oriented metadata that uses the term.

7. The method as claimed in claim 6 wherein building the content index comprises encoding each knowledge base document in Extensible Markup Language (XML).

8. The method as claimed in claim 6 wherein building the content index comprises including in the knowledge base document at least one of one or more references indicating relation between the term and the content and one or more references indicating a parent/child relation.

9. The method as claimed in claim 6 wherein providing the taxonomy services comprises:
   receiving a query from a user, the query including one or more search terms; and
   dynamically determining a taxonomy for each search term in the query using the knowledge base documents.

10. The method as claimed in claim 9 wherein providing the taxonomy services further comprises:
    weighting each search term in the query;
    building a query specification based on weights of search terms; and
    searching the knowledge base documents using the query specification.

11. The method as claimed in claim 10 wherein weighting each search term comprises weighting search terms incrementally higher than related parent terms.

12. The method as claimed in claim 10 wherein weighting each search term comprises using a term stemming function for stemming terms that are stemmable, and weighting non-stemmed terms incrementally higher than stemmed terms.

13. The method as claimed in claim 1 wherein providing the taxonomy services comprises dynamically determining a taxonomy for a search term using the subject index.

14. The method as claimed in claim 13 wherein providing the taxonomy services comprises:
receiving a search term;
finding any indexed terms that are parent topic terms, sibling topic terms or child topic terms of the search term; and
providing a taxonomy result indicating the indexed terms found in response to the search term.

15. The method as claimed in claim 1 wherein providing the taxonomy services comprises receiving a drilling request for drilling an item in a report, the drilling request including one or more search terms.

16. The method as claimed in claim 1 further comprising managing relevance scores for search result items using the content index.

17. The method as claimed in claim 16 wherein managing the relevance scores comprises:
assigning base scores to individual metadata elements depending on their business relevance determined using data in the content index; and
calculating a relevance score for each search result item by aggregating base scores assigned to individual metadata elements included in the search result item.

18. The method as claimed in claim 17 wherein assigning the base scores comprises determining a base score of a metadata element based on at least one of metadata type or the metadata element, a parent metadata type of the metadata element, a uniqueness of the metadata element, usage of a target by other users, subscription to a target by other users, running/compiling a target, a publish date of a target, and an update date of a target.

19. The method as claimed in claim 1 wherein the content index includes an entry for each of a plurality of terms, wherein each entry includes information relating to parent/child relationships for the term associated with the entry.

20. The method of claim 1, wherein dynamically determining the one or more drill targets at run-time comprises:
building a source context based on current settings; and
dynamically determining the one or more drill targets at run-time based on the subject index and the source context.

21. The method of claim 20, wherein the current settings comprise at least one of current filter values, current view settings, and visible category information.

22. A system comprising:
at least one computer;
an indexing engine executable by the at least one computer to index content of source business oriented metadata, wherein the indexing engine comprises a content scanner that reads content of business oriented metadata included in one or more source metadata documents, the business oriented metadata including metadata representing a structured hierarchy of reporting elements, extracts, from the business oriented metadata, information relating to a structure of the structured hierarchy, defines a taxonomy of the business oriented metadata using the one or more parent/child relationships between terms within the content of the business oriented metadata, and builds a content index of the business oriented metadata including a subject index representing the taxonomy of the business oriented metadata, and wherein the information relating to the structure of the structured hierarchy includes one or more parent/child relationships;
an index store that stores the content index of the business oriented metadata; and
a taxonomy engine executable by the at least one computer to dynamically determine one or more drill targets at run-time based on the subject index to provide taxonomy services to users using the content index, wherein each of the drill targets links at least two different source metadata documents.

23. The business taxonomy management system as claimed in claim 22 wherein
the business oriented metadata includes OLAP or dimensional business data; and
the content scanner obtains information of the structured hierarchy from the OLAP and dimensional business data to define the taxonomy of the business oriented metadata.

24. The business taxonomy management system as claimed in claim 22 wherein the content scanner uses an index and search functions file, and collects primary metadata hierarchies of the business oriented metadata by adding target items to the index and search functions file.

25. The business taxonomy management system as claimed in claim 24 wherein the content scanner weights metadata found in the target items higher than metadata found elsewhere.

26. The business taxonomy management system as claimed in claim 22 wherein
the source metadata documents contain terms to be indexed, and
the content scanner builds the content index to include, for each term in each source metadata document to be indexed, a unique document identifier, a document date, and at least one of one or more database queries used in structured reporting elements of the source metadata documents, one or more linkages to other structured reporting elements in the source metadata document and one or more linkages to other structured reporting elements in other source metadata documents.

27. The business taxonomy management system as claimed in claim 22 wherein
the source metadata documents contain terms to be indexed, and
the content scanner builds, as the content index, a knowledge base document for each term in each source metadata document to store a knowledge base representation of the term along with one or more references to content of the business oriented metadata that uses the term.

28. The business taxonomy management system as claimed in claim 27 wherein the content scanner encodes each knowledge base document in Extensible Markup Language (XML).

29. The business taxonomy management system as claimed in claim 27 wherein the references to content include one or more references indicating relation between the term and the content.

30. The business taxonomy management system as claimed in claim 29 wherein the relation between the term and the content is a parent/child relation.

31. The business taxonomy management system as claimed in claim 27 wherein the taxonomy engine receives a query from a user, the query including one or more search terms, and the taxonomy engine dynamically determines a taxonomy for each search term in the query using the knowledge base documents.

32. The business taxonomy management system as claimed in claim 31 wherein the taxonomy engine weights each search term in the query to build a query specification for searching the knowledge base documents.

33. The business taxonomy management system as claimed in claim 32 wherein the taxonomy engine weights search terms incrementally higher than related parent terms.

34. The business taxonomy management system as claimed in claim 32 wherein the taxonomy engine uses a term stemming function for stemming terms that are stemmable, and weights non-stemmed terms incrementally higher than stemmed terms.

35. The business taxonomy management system as claimed in claim 22 wherein the taxonomy engine dynamically determines a taxonomy for a search term using the subject index.

36. The business taxonomy management system as claimed in claim 35 wherein the taxonomy engine provides a taxonomy result in response to a search term, the taxonomy result including one or more indexed terms that are parent topic terms, sibling topic terms or child topic terms of the search term.

37. The business taxonomy management system as claimed in claim 35 wherein the query is a drilling request for drilling an item in a report.

38. The business taxonomy management system as claimed in claim 22 further comprising a ranking manager for managing relevance scores for search result items using the content index.

39. The business taxonomy management system as claimed in claim 38 wherein the ranking manager comprises:
 a business relevance handler that handles assignment of base scores to individual metadata elements depending on their business relevance determined using data in the content index; and
 a score calculator that calculates a relevance score for each search result item by aggregating base scores assigned to individual metadata elements included in the search result item.

40. The business taxonomy management system as claimed in claim 39 wherein the business relevance handler determines a base score of a metadata element based on at least one of a metadata type of the metadata element, a parent metadata type of the metadata element, a uniqueness of the metadata element, usage of a target by other users, subscription to a target by other users, running/compiling a target, a publish date of a target, and an update date of a target.

41. A computer readable medium storing instructions that cause a computer to:
 read content of business oriented metadata included in one or more source metadata documents, the business oriented metadata including metadata representing a structured hierarchy of reporting elements;
 extract, from the business oriented metadata, information relating to a structure of the structured hierarchy, wherein the information relating to the structure of the structured hierarchy includes one or more parent/child relationships between terms within the content of the business oriented metadata;
 define a taxonomy of the business oriented metadata using the one or more parent/child relationships;
 build a content index of the business oriented metadata including a subject index representing the taxonomy of the business oriented metadata;
 store the content index of the business oriented metadata; and
 provide taxonomy services to users using the content index, wherein the instructions that cause the computer to provide the taxonomy services comprise instructions that cause the computer to dynamically determine one or more drill targets at run-time based on the subject index, and wherein each of the drill targets links at least two different source metadata documents.

* * * * *